United States Patent Office 2,932,553
Patented Apr. 12, 1960

2,932,553

PREPARATION OF ANHYDROUS HALIDES OF TRANSITION METALS

Rostislav Didtschenko, Lakewood, Ohio, assignor to Union Carbide Corporation, a corporation of New York No Drawing. Application February 20, 1957
Serial No. 641,240

9 Claims. (Cl. 23—14.5)

This invention relates to a method for preparing an anhydrous halide of a lanthanide or actinide.

The anhydrous halides of lanthanide or actinide metals are commonly utilized as starting materials for the production of the lanthanide or actinide metals or monosulfides by fused salt electrolysis. High purity of starting materials is necessary for the electrolytic process if it is to yield a product of good quality. However, the methods presently available for the preparation of the halides generally produce a product contaminated with an oxyhalide, an impurity that is particularly undesirable in the electrolytic reaction.

It is an object of this invention to provide a process for preparing anhydrous halides of lanthanides and actinides.

It is another object of this invention to provide such a process wherein the product is free from oxyhalide contamination.

Other objects will be apparent from the disclosure and appended claims.

The achievement of the objects is based on the discovery that either the anhydrous or the hydrated double salt of a lanthanide or an actinide halide and an organic amine hydrohalide may be thermally decomposed to give an anhydrous lanthanide or actinide halide. If the double salt is hydrated, a major portion of the water of hydration should be removed prior to the thermal decomposition. Failure to do so may result in the formation of the oxyhalide.

The invention may be more clearly understood by describing the preparation of cerium trichloride.

Cerium trichloride and pyridine hydrochloride form a hydrated double salt which may be represented by the formula $CeCl_3 \cdot R \cdot HCl \cdot 2H_2O$ wherein "R" is pyridine. The salt is placed in a suitable container and heated at a temperature in a range where the dehydration of the salt proceeds with substantially no decomposition until most of the water of hydration has been evolved. During this step the temperature should not exceed about 150° C. The salt is then decomposed by heating it at a temperature in the range wherein pyridine hydrochloride is evolved without the evolution or decomposition of the residual cerium trichloride.

The dehydration and decomposition are performed in a non-reactive atmosphere such as a hydrogen chloride atmosphere, or an oxygen-free, moisture-free inert gas atmosphere. The water evolved may be condensed in a trap as a solution of hydrochloric acid; the pyridine hydrochloride may be condensed and crystallized on a cold surface.

The double salts may be prepared by reacting a lanthanide or actinide halide with an organic amine hydrohalide in a solvent in which the reactants are soluble and in which the double salt formed by the reaction is insoluble. The insoluble reaction product is precipitated and separated from the reaction mixture and thermally decomposed according to the methods described previously.

The hydrohalides of pyridine, quinoline, aniline and the alkyl amines are suited for use in this invention, and particularly the hydrochlorides of these amines. Best results have been obtained with double salts prepared from pyridine hydrochloride.

The amine hydrohalides may be prepared in the reaction mixture by adding the amine to the reaction mixture and introducing hydrogen halide gas to the solution with agitation. The amine hydrohalide may also be added directly. The amine hydrohalide recovered from the decomposition of the double salt may be utilized as a feed material, thereby making the process more economical.

While the present invention applies to the preparation of lanthanide and actinide halides in general, the process is particularly useful in the preparation of the chlorides of these metals.

Examples of solvents which might be employed in the preparation of the double salts are methyl alcohol, acetone, ethyl alcohol, ether and mixtures of these solvents. Even water can be used but the precipitated double salt is then difficult to filter. Methyl alcohol and acetone are the preferred solvents.

In an example of the invention, two hundred grams of finely ground commercial cerium trichloride heptahydrate and one hundred and fifty milliliters of methyl alcohol were mixed, and the mixture was refluxed for 30 minutes with vigorous agitation. Most of the salt went into solution but some of it remained in suspension. The insoluble residue may be filtered out if its presence in the final product is undesirable, but was not filtered out in this case. Fifty to sixty grams of pyridine were added. Hydrogen chloride gas was introduced to the liquid in a fast stream converting the pyridine to pyridine hydrochloride, which reacted with the cerium trichloride to produce a very voluminous precipitate of the cerium trichloridepyridine hydrochloride double salt. Three hundred milliliters of acetone were added to complete the precipitation of the double salt. The hydrogen chloride addition was continued until the supernatant liquid turned yellow. The reaction mixture was then cooled to room temperature and filtered through a sintered glass filter plate. The precipitate was washed with three 200 milliliter volumes of acetone and dried overnight in a vacuum. About 200 grams of dry salt were produced.

The dry salt was placed in a ceramic boat inside of a Pyrex tube. One end of the tube was attached through a trap to a water aspirator. Hydrogen chloride gas which had bubbled through concentrated sulfuric acid was introduced through the other end of the tube. The rate of hydrogen chloride flow and the vacuum pump were adjusted to give a vacuum of about 20 millimeters of mercury. The dry salt was heated by means of a resistance coil at 100° C. to 150° C. for about 4 hours, 150° C. to 200° C. for about 2 hours, and finally at 300° C. to 350° C. for about 2 hours. Between 100° C. and 150° C. most of the water of hydration came off. At 200° C. pyridine chloride began subliming and condensed on the cold end of the tube. By this means 125 to 128 grams of anhydrous cerium trichloride were obtained; this represented a yield of about 96 percent to 99 percent.

The procedure was repeated, but instead of preparing the pyridine hydrochloride in the reaction vessel, it was added directly as an alcoholic solution. Seventy-five to eighty-five grams of pyridine hydrochloride dissolved in 50 to 75 milliliters of methyl alcohol were introduced through a dropping funnel with vigorous agitation. The yield of anhydrous cerium trichloride was 195 grams.

While the process of the invention was described in terms of the preparation of anhydrous cerium trichloride by decomposition of a cerium trichloride-pyridine hydrochloride double salt, the process is broadly applicable to the preparation of lanthanide and actinide halides by decomposition of the halide-amine hydrohalides. This is exemplified by the preparation of thorium tetrachloride which follows.

A reaction mixture was prepared containing 17.2 grams of hydrated thorium tetrachloride, 25 cubic centimeters of methyl alcohol, 5 grams of pyridine, and 50 cubic centimeters of acetone. Hydrogen chloride gas was introduced until the solution turned a bright yellow. The solution was then cooled in ice water and the precipitate was filtered and washed in acetone. Approximately 15 grams of a highly-crystalline double salt were obtained which were thermally decomposed according to the method previously described to give anhydrous thorium tetrachloride.

What is claimed is:

1. The method for preparing an anhydrous halide of a transition metal comprising reacting at least one halide of a transition metal selected from the group consisting of lanthanides and thorium with an organic amine hydrohalide selected from the group consisting of pyridine hydrohalide, quinoline hydrohalide, aniline hydrohalide and alkyl amine hydrohalides in a solvent in which the reactants are soluble and the reaction product is insoluble; said solvent being selected from the group consisting of methyl alcohol, acetone, ethyl alcohol, ether, water and mixtures thereof, precipitating from said solvent the double salt reaction product; separating said double salt from the reaction mixture; and thermally decomposing said double salt to the anhydrous halide of the transition metal by heating said double salt in a non-reactive, moisture-free, inert gas atmosphere at a temperature ranging from about 100° C. to about 300° C.

2. The method for preparing an anhydrous chloride of a transition metal comprising reacting at least one chloride of a transition metal selected from the group consisting of lanthanides and thorium with an organic amine hydrochloride in a solvent in which the reactants are soluble and the reaction product is insoluble; said solvent being selected from the group consisting of methyl alcohol, acetone, ethyl alcohol, ether, water and mixtures thereof, precipitating from said solvent the double salt reaction product; separating said double salt from the reaction mixture; and thermally decomposing said double salt to the anhydrous chloride of the transition metal by heating said double salt in a non-reactive, moisture-free, inert gas atmosphere at a temperature ranging from about 100° C. to about 300° C.

3. The method for preparing an anhydrous chloride of a transition metal comprising reacting at least one chloride of a transition metal selected from the group consisting of lanthanides and thorium with an organic amine hydrochloride selected from the group consisting of pyridine hydrochloride, quinoline hydrochloride, aniline hydrochloride and alkyl amine hydrochlorides in a solvent in which the reactants are soluble and the reaction product is insoluble; said solvent being selected from the group consisting of methyl alcohol, acetone, ethyl alcohol, ether, water and mixtures thereof, precipitating from said solvent the double salt reaction product; separating said double salt from the reaction mixture; and thermally decomposing said double salt to the anhydrous chloride of the transition metal by heating said double salt in a non-reactive, moisture-free, inert gas atmosphere at a temperature ranging from about 100° C. to about 300° C.

4. The method for preparing an anhydrous halide of a transition metal comprising reacting at least one halide of a transition metal selected from the group consisting of lanthanides and thorium with an organic amine hydrohalide in a solvent in which the reactants are soluble and the reaction product is insoluble; said solvent being selected from the group consisting of methyl alcohol, acetone, ethyl alcohol, ether, water and mixtures thereof, precipitating from said solvent the double salt reaction product; separating said double salt from the reaction mixture; heating said double salt at a temperature in the range wherein water of hydration is evolved but wherein the double salt is stable, until the double salt is substantially dehydrated; decomposing the said dehydrated double salt by heating it at a temperature in the range wherein the amine hydrohalide is evolved but wherein the metal halide residue is not evolved and is not decomposed, said temperature range being from about 100° C. to about 350° C., until the said metal halide is substantially free from said amine hydrohalide; and maintaining the metal-containing salt in a non-reactive atmosphere while the said salt is at an elevated temperature during the said dehydration and decomposition steps.

5. The method for preparing an anhydrous halide of a transition metal comprising reacting at least one halide of a transition metal selected from the group consisting of lanthanides and thorium with an organic amine hydrohalide selected from the group consisting of pyridine hydrohalide, quinoline hydrohalide, aniline hydrohalide and alkyl amine hydrohalides in a solvent in which the reactants are soluble and the reaction product is insoluble; said solvent being selected from the group consisting of methyl alcohol, acetone, ethyl alcohol, ether, water and mixtures thereof, precipitating from said solvent the double salt reaction product; separating said double salt from the reaction mixture; heating said double salt at a temperature in the range wherein water of hydration is evolved but wherein the double salt is stable until the double salt is substantially dehydrated; decomposing the said dehydrated double salt by heating it at a temperature in the range wherein the amine hydrohalide is evolved but wherein the metal halide residue is not evolved and is not decomposed, said temperature range being from about 100° C. to about 350° C., until the said metal halide is substantially free from said amine hydrohalide; and maintaining the metal-containing salt in a non-reactive atmosphere while the said salt is at an elevated temperature during the said dehydration and decomposition steps.

6. The method for preparing an anhydrous chloride of a trivalent transition metal comprising reacting at least one chloride of a transition metal selected from the group consisting of lanthanides and thorium with an organic amine hydrochloride in a solvent in which the reactants are soluble and the reaction product is insoluble; said solvent being selected from the group consisting of methyl alcohol, acetone, ethyl alcohol, ether, water and mixtures thereof, precipitating from said solvent the double salt reaction product; separating said double salt from the reaction mixture; heating said double salt at a temperature in the range wherein water of hydration is evolved but wherein the double salt is stable, until the double salt is substantially dehydrated; decomposing the said dehydrated double salt by heating it at a temperature in the range wherein the amine hydrochloride is evolved but wherein the metal chloride residue is not evolved and is not decomposed, said temperature range being from about 100° C. to about 350° C., until the said metal chloride is substantially free from said amine hydrochloride; and maintaining the metal-containing salt in a non-reactive atmosphere while the said salt is at an elevated temperature during the said dehydration and decomposition steps.

7. The method for preparing an anhydrous chloride of a transition metal comprising reacting at least one chloride of a transition metal selected from the group consisting of lanthanides and thorium with an organic amine hydrochloride selected from the group consisting of pyridine hydrochloride, quinoline hydrochloride, aniline hydrochloride and alkyl amine hydrochlorides in a solvent in which the reactants are soluble and the reaction product is insoluble; said solvent being selected from the group consisting of methyl acohol, acetone, ethyl alcohol, ether, water and mixtures thereof, precipitating from said solvent the double salt reaction product; separating said double salt from the reaction mixture; heating said double salt at a temperature in the range wherein water of hydration is evolved but wherein the double salt is stable, until the double salt is substantially dehydrated; decomposing the said dehydrated double salt by heating it at a temperature in the range wherein the amine hydrochloride is evolved but wherein the metal chloride residue is not evolved and is not decomposed, said temperature range being from about 100° C. to about 350° C., until the said metal chloride is substantially free from said amine hydrochloride; and maintaining the metal-containing salt in a non-reactive atmosphere while the said salt is at an elevated temperature during the said dehydration and decomposition steps.

8. The method for preparing an anhydrous cerium trihalide comprising reacting a cerium trihalide with an organic amine hydrohalide selected from the group consisting of pyridine hydrohalide, quinoline hydrohalide, aniline hydrohalide and alkyl amine hydrohalides in a solvent in which the reactants are soluble and in which the double salt of cerium trihalide and the organic amine hydrohalide is insoluble; said solvent being selected from the group consisting of methyl alcohol, acetone, ethyl alcohol, ether, water and mixtures thereof, precipitating the double salt so formed from said solvent; separating said double salt from the reaction mixture; heating said double salt at a temperature wherein the double salt is stable until the double salt is substantially dehydrated; decomposing the said substantially dehydrated double salt by heating it at a temperature in the range wherein the amine hydrohalide is evolved but wherein cerium trihalide is not evolved and is not decomposed, said temperature range being from about 100° C. to about 350° C., until the cerium trihalide is substantially free from said amine hydrohalide; and maintaining the cerium-containing salt in a non-reactive atmosphere while said salt is at an elevated temperature during the said dehydration and decomposition steps.

9. A method in accordance with claim 8 wherein the halide is a chloride and wherein the organic amine is pyridine hydrochloride.

No references cited.